US012663665B2

(12) United States Patent　　(10) Patent No.:　US 12,663,665 B2

Pelc et al.　　(45) Date of Patent:　Jun. 23, 2026

(54) COMPACT OPTICAL PHASE SHIFTER

(71) Applicant: Apple Inc., Cupertino, CA (US)

(72) Inventors: Jason S. Pelc, Sunnyvale, CA (US);
Wei Liu, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 196 days.

(21) Appl. No.: 18/230,098

(22) Filed: Aug. 3, 2023

(65) Prior Publication Data

US 2024/0094566 A1　Mar. 21, 2024

Related U.S. Application Data

(60) Provisional application No. 63/407,993, filed on Sep. 19, 2022.

(51) Int. Cl.
　G02F 1/025　　(2006.01)
　G02F 1/015　　(2006.01)
(52) U.S. Cl.
　CPC ............ G02F 1/025 (2013.01); G02F 1/0151 (2021.01)
(58) Field of Classification Search
　CPC ............................... G02F 1/025; G02F 1/0151
　See application file for complete search history.

(56) References Cited

U.S. PATENT DOCUMENTS

| | | | |
|---|---|---|---|
| 5,091,983 | A | 2/1992 | Lukosz |
| 6,374,001 | B1 | 4/2002 | Bozeat et al. |
| 6,879,751 | B2 | 4/2005 | Deliwala |
| 6,891,985 | B2 | 5/2005 | Deliwala |
| 7,747,122 | B2 | 6/2010 | Shetrit et al. |
| 8,532,440 | B2 | 9/2013 | Ushida et al. |
| 8,559,769 | B2 | 10/2013 | Rasras |
| 8,873,895 | B2 | 10/2014 | Fujikata et al. |
| 9,229,251 | B2 | 1/2016 | Akiyama et al. |
| 10,996,539 | B2 | 5/2021 | Takahashi et al. |
| 11,226,504 | B2 | 1/2022 | O'Keefe et al. |
| 11,275,261 | B2 | 3/2022 | Takahashi et al. |
| 2002/0094186 | A1 | 7/2002 | Wu |
| 2003/0003736 | A1 | 1/2003 | Delwala |
| 2004/0120638 | A1 | 6/2004 | Frick |
| 2009/0238515 | A1 | 9/2009 | Fattal |
| 2012/0063714 | A1 | 3/2012 | Park et al. |
| 2012/0195547 | A1* | 8/2012 | Rasras .................. G02F 1/0126 385/16 |
| 2014/0233878 | A1 | 8/2014 | Goi et al. |

(Continued)

FOREIGN PATENT DOCUMENTS

| | | |
|---|---|---|
| CA | 2725883 | 11/2013 |
| EP | 0968455 | 1/2008 |

(Continued)

OTHER PUBLICATIONS

Witzens, "High-Speed Silicon Photonics Modulators," Proceedings of the IEEE, vol. 106, No. 12, Dec. 2018, pp. 2158-2182.

*Primary Examiner* — Tina Wong

(74) *Attorney, Agent, or Firm* — Brownstein Hyatt Farber Schreck, LLP

(57) ABSTRACT

Embodiments are directed to photonic integrated circuits that include a carrier-based phase shifter. The carrier-based phase shifter is configured as a PIN phase shifter with a pair of traces that delivers current through a PIN diode. The PIN phase shifter is configured such that current flows through the pair of traces in a common direction.

20 Claims, 7 Drawing Sheets

(56) References Cited

U.S. PATENT DOCUMENTS

| | | | |
|---|---|---|---|
| 2016/0004104 A1 | 1/2016 | Feng et al. | |
| 2016/0313577 A1 | 10/2016 | Sun et al. | |
| 2017/0155452 A1* | 6/2017 | Nagra | G02F 1/025 |
| 2021/0018681 A1 | 1/2021 | Picard | |
| 2022/0197012 A1 | 6/2022 | Han | |
| 2023/0055779 A1 | 2/2023 | Pruessner | |
| 2023/0152662 A1 | 5/2023 | Doerr | |
| 2023/0420919 A1* | 12/2023 | Lauer | H01S 5/3404 |
| 2024/0061280 A1 | 2/2024 | Arbore et al. | |
| 2024/0280842 A1 | 8/2024 | Pelc et al. | |

FOREIGN PATENT DOCUMENTS

| | | |
|---|---|---|
| KR | 10-0779091 | 11/2007 |
| KR | 10-2009-0059709 | 6/2009 |
| KR | 10-2012-0026318 | 3/2012 |
| WO | WO 2002/031555 | 4/2002 |
| WO | WO 2005/101115 | 10/2005 |

* cited by examiner

200

124  110    120a      202      104    120b  204      206        124

112

122a      114            116        122b

104

206

122a
122a
114
116
246a
120a
246a
246b
122b
122b
120b
204
208
210
212

COMPACT OPTICAL PHASE SHIFTER

CROSS-REFERENCE TO RELATED APPLICATION

This application is a nonprovisional and claims the benefit under 35 U.S.C. § 119(e) of U.S. Provisional Patent Application No. 63/407,993, filed Sep. 19, 2022, the contents of which are incorporated herein by reference as if fully disclosed herein.

FIELD

This disclosure relates generally to optical phase shifters. More particularly, this disclosure relates to PIN phase shifters having a compact footprint.

BACKGROUND

Controllable optical phase shifters are often used in photonic integrated circuits to selectively modulate the phase of light carried by a waveguide. For example, thermo-optic phase shifters change the refractive index of a portion of a waveguide by changing its temperature, thereby inducing a phase shift in the light carried by the waveguide. Other phase shifters may modulate the phase of light by moving a structure in relation to a waveguide to change the effective refractive index experienced by the light. Different optical phase shifters typically have tradeoffs between speed (i.e., how quickly the optical phase shifter can achieve a given phase change), size, optical loss, and power consumption. Accordingly, it may be desirable to provide compact and efficient phase shifters.

SUMMARY

Embodiments described herein are directed to phase shifters, photonic integrated circuits including phase shifters, and methods of operating phase shifters. Some embodiments are directed to a photonic integrated circuit that includes a phase shifter. The photonic integrated circuit includes a substrate, a cladding layer, and a waveguide layer positioned on the cladding layer. The waveguide layer includes a first doping region, a second doping region, and a waveguide positioned between the first doping region and the second doping region to form a diode. In some instances the diode is configured as a PIN diode. The phase shifter includes the diode, a first set of conductive vias, and a first conductive trace electrically connected to the first doping region via the first set of conductive vias. The phase shifter also includes a second set of conductive vias, a second conductive trace electrically connected to the second doping region via the second set of conductive vias, and a control circuit configured to drive current through the PIN diode via the first conductive trace and the second conductive trace. The phase shifter is configured such that the current driven through the diode flows through the first conductive trace and the second conductive trace in a common direction along a length of the waveguide.

In some variations, the phase shifter also includes a third set of conductive vias, and a third conductive trace electrically connected to the second conductive trace via the third set of conductive vias. In some of these variations, the phase shifter includes a current injection region on the first conductive trace and a current extraction region on the third conductive trace, such that the control circuit is electrically connected to the current injection region and the current extraction region. In other variations, the second conductive trace includes a first portion, a second portion, and a third portion, where the first portion is connected to the second set of conductive vias. In these instances, the phase shifter is configured such that current driven through the PIN diode flows through the first portion in the common direction and flows through the third portion in an additional direction opposite the common direction. In some of these embodiments, the phase shifter includes a current injection region on the first conductive trace and a current extraction region on the third portion, and the control circuit is electrically connected to the current injection region and the current extraction region. The rib waveguide may, in some instances, be a rib waveguide.

Other embodiments are directed to a photonic integrated circuit that includes a first phase shifter, a second phase shifter, and control circuitry configured to operate the first phase shifter and the second phase shifter. Each of the first phase shifter and the second phase shifter includes a diode having a waveguide positioned between a first doping region and a second doping region, a first conductive trace electrically connected to the first doping region, and a second conductive trace electrically connected to the second doping region. In some instances, the diode of each phase shifter is configured as a PIN diode. The second conductive trace of the first phase shifter comprises a first portion, a second portion, and a third portion, and the second portion of the second conductive trace of the first phase shifter crosses over the waveguide of the second phase shifter. The control circuit is configured to drive current through the diode of the first phase shifter such that current flows through the first conductive trace of the first phase shifter and the first portion of the second conductive trace of the first phase shifter in a common direction along a length of the waveguide of the first phase shifter.

In some of these variations, the first phase shifter comprises a current injection region on the first conductive trace of the first phase shifter and a current extraction region on the third portion of the second conductive trace of the first phase shifter. The control circuit is electrically connected to the current injection region and the current extraction region. In other variations, the second conductive trace of the second phase shifter includes a first portion, a second portion, and a third portion. The control circuit is configured to drive current through the diode of the second phase shifter such that current flows through the first conductive trace of the second phase shifter in the common direction, through the first portion of the second conductive trace of the second phase shifter in the common direction, and through the third portion of the second conductive trace of the second phase shifter in an additional direction opposite the common direction. In still other variations, the second conductive trace of the second phase shifter is electrically connected to the second portion of the second conductive trace of the first phase shifter.

In some variations, the photonic integrated circuit includes a third phase shifter. The third phase shifter includes a diode that includes a waveguide positioned between a first doping region and a second doping region. The third phase shifter also includes a first conductive trace electrically connected to the first doping region, and a second conductive trace electrically connected to the second doping region. In some of these variations, the second portion of the second conductive trace of the first phase shifter crosses over the waveguide of the third phase shifter. Additionally or alternatively, the second conductive trace of the second phase shifter includes a first portion, a second portion, and a third portion, such that the second portion of the second conductive trace of the second phase shifter crosses over the waveguide of the third phase shifter.

Still other embodiments are directed to a photonic integrated circuit that includes a first phase shifter, a second phase shifter, and control circuitry configured to operate the first phase shifter and the second phase shifter. Each of the first phase shifter and the second phase shifter includes a diode having a waveguide positioned between a first doping region and a second doping region, a first conductive trace electrically connected to the first doping region, and a second conductive trace electrically connected to the second doping region. The second conductive trace of the first phase shifter and the second conductive trace of the second phase shifter are electrically connected to a common conductive trace, and the control circuit is configured to drive current through the diode of the first phase shifter such that current flows through the first conductive trace of the first phase shifter and the first portion of the second conductive trace of the first phase shifter in a common direction along a length of the waveguide of the first phase shifter.

In some of these variations, the common conductive trace comprises a first portion that crosses over the waveguide of the second phase shifter. The photonic integrated circuit may also include a third phase shifter that includes a diode having a waveguide positioned between a first doping region and a second doping region. The third phase shifter also includes a first conductive trace electrically connected to the first doping region, and a second conductive trace electrically connected to the second doping region. The second conductive trace of the third waveguide may be electrically connected to the common conductive trace. In some instances, the first portion of the common conductive trace crosses over the waveguide of the third phase shifter.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to photonic integrated circuits that include a carrier-based phase shifter. Specifically, the carrier-based phase shifter includes a diode or a capacitor electrically connected to a pair of conductive traves. The carrier-based phase shifter is configured such that current is delivered through the diode or capacitor via the pair of conductive traces to change a concentration of charge carriers within a waveguide. The principles discussed herein may be applied to any carrier-based phase shifter in which a pair of conductive traces delivers current through a phase-adjustment component (e.g., a PIN diode, a PIPIN diode, a silicon-insulator-silicon capacitor, or the like) that changes a concentration of charge carriers within a waveguide. Specific examples described herein, however, are discussed in the context of a PIN phase shifter in which the phase-adjustment component is a PIN diode.

Specifically, some embodiments of the carrier-based phase shifters described here are configured as a PIN phase shifter with a pair of conductive traces that delivers current through a PIN diode. The PIN phase shifter is configured such that current flows through the pair of conductive traces in a common direction. This current flow helps improve the uniformity of current flowing through the PIN diode, which allows the pair of conductive traces to be smaller (thereby reducing the size of the PIN phase shifter) without substantially impacting the optical losses associated with operation of the PIN phase shifter.

These and other embodiments are discussed below with reference to FIGS. 1A-5. However, those skilled in the art will readily appreciate that the detailed description given herein with respect to these Figures is for explanatory purposes only and should not be construed as limiting.

Figure 1A:
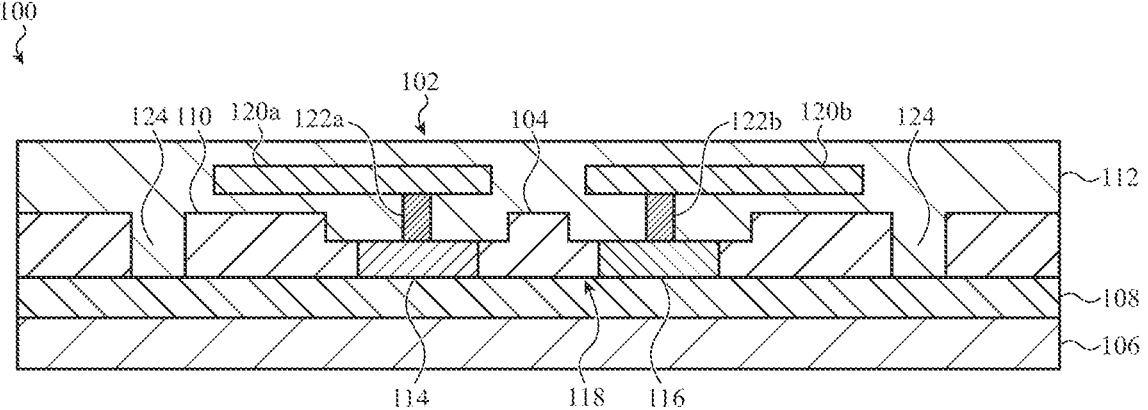
FIG. 1A shows a cross-sectional side view of a variation of an optical phase shifter as described herein.

FIG. 1A shows a cross-sectional side view of a photonic integrated circuit 100 including a PIN phase shifter 102 that is configured to modulate the phase of light traveling through a waveguide 104. Specifically, the photonic integrated circuit 100 includes a substrate 106, a first cladding layer 108 supported by the substrate 106 (either directly or via one or more intervening layers), and a waveguide layer 110 positioned on the first cladding layer 108. In some instances, one or more additional surfaces of the waveguide layer 110 is covered with a second cladding layer 112, which may help provide optical confinement to the waveguide layer 110 as well as to electrically insulate other components of the PIN phase shifter 102. While each of the first cladding layer 108 and second cladding layer 112 is shown in FIG. 1A as a single layer, either of these layers may be formed using multiple sub-layers that are deposited at different times (e.g., with one or more intervening process steps).

The various layers of the photonic integrated circuit may be formed from any suitable materials depending on the wavelength or wavelengths of light that will be carried by the waveguide 104. For example, in some variations, the waveguide layer 110 is formed from silicon, silicon nitride, silica, or the like, the first and second cladding layers 108, 112 are formed from a dielectric material (or materials) such as silicon dioxide, and the substrate 106 is formed from silicon.

The waveguide layer 110 defines multiple components of the PIN phase shifter 102. Specifically, the waveguide layer 110 defines the waveguide 104, which in the variation shown in FIG. 1A is configured as a rib waveguide. The waveguide 104 is positioned between a first doping region 114 of the waveguide layer 110 and a second doping region 116 of the waveguide layer 110. Specifically the first doping region 114 is doped with a first material to form a p-doped region and the second doping region 116 is doped with a second material to form an n-doped region. The first doping region 114, waveguide 104, and second doping region 116 collectively form a PIN diode 118. When current flows through the PIN diode 118 (e.g., from the first doping region 114 to the second doping region 116 through the waveguide 104), charge carriers are injected into the waveguide 104, which acts as the intrinsic region of the PIN diode 118. This carrier injection changes the refractive index of the portion of the waveguide 104 positioned between the first doping region 114 and second doping region 116, and this modulates the phase of light traveling through the waveguide 104. Accordingly, the PIN phase shifter 102 may controllably change the phase of light travelling through the waveguide 104 by driving current through the PIN diode 118.

In order to provide a current path through the PIN diode 118, the PIN phase shifter 102 has a pair of conductive traces that includes a first conductive trace 120a and a second conductive trace 120b. The first conductive trace 120a and second conductive trace 120b may be embedded in (as shown in FIG. 1A) or positioned on the second cladding layer 112, or otherwise suspended above the PIN diode 118. The first conductive trace 120a is electrically connected to the first doping region 114 via a first set of conductive vias 122a, and the second conductive trace 120b is electrically connected to the second doping region 116 via a second set of conductive vias 122b. The vias of the first and second sets of vias 122a, 122b may be formed from any suitable electrically conductive material (e.g., a metal or the like), and may be deposited in openings in the first cladding layer 108 to contact either the first doping region 114 or the second doping region 116. Additionally, the photonic integrated circuit 100 may define a set of trenches 124 that separates the portion of the waveguide layer 110 associated with the PIN phase shifter 102 (i.e., the PIN diode 118) from other sections of the waveguide layer 110. This may provide electrical isolation between adjacent PIN phase shifters.

Figure 1B:
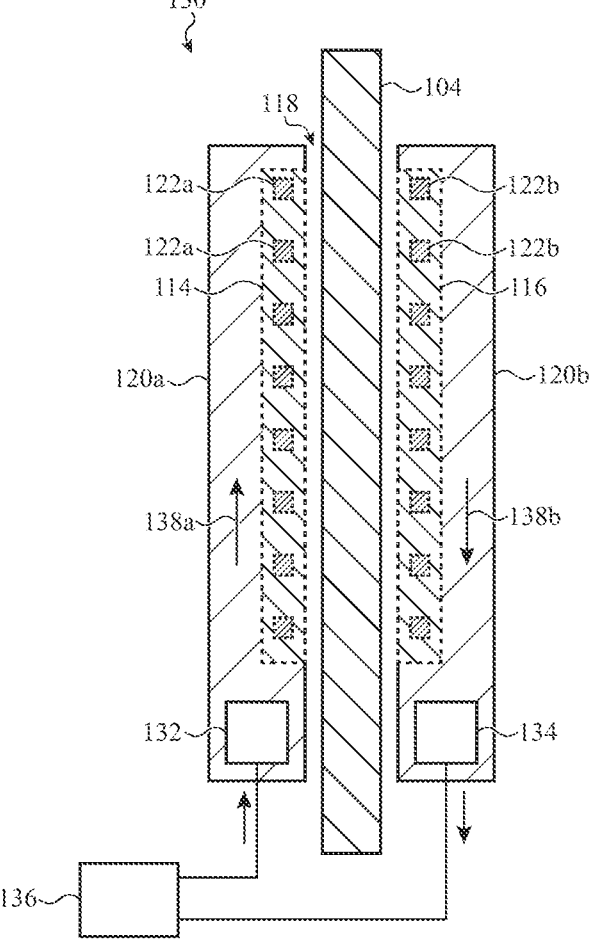
FIG. 1B shows a top view of one configuration of the optical phase shifter of FIG. 1A.

Typically, a PIN phase shifter such as the PIN phase shifter 102 of FIG. 1A is configured such that current is injected and extracted from the phase shifter from a single end of the device. For example, FIG. 1B shows a top view of such a PIN phase shifter 130. The PIN phase shifter 130 can be configured to have the same components as the PIN phase shifter 102 of FIG. 1A (with like components labeled the same as in FIG. 1A), except that the first conductive trace 120a has a current injection region 132 and the second conductive trace 120b has a current extraction region 134. The current injection region 132 and the current extraction region 134 represent regions of the first conductive trace 120a and the second conductive trace 120b, respectively, that are electrically connected to a control circuit 136 (e.g., through an opening in the second cladding layer 112). The control circuit 136 is operable to drive current through the PIN diode 118, such that current is injected into the first conductive trace 120a via the current injection region 132, flows through the PIN diode 118, and is extracted from the second conductive trace 120b via the current extraction region 134.

In the variation shown in FIG. 1B the current injection region 132 and the current extraction region 134 are positioned such that current flows through the first conductive trace 120a in a first direction 138a and current flows through the second conductive trace 120b in a second direction 138b opposite the first direction. This allows current to be injected and extracted from the same side of the photonic integrated circuit, which can reduce the overall capacitance of the PIN phase shifter 102, and thereby facilitate high frequency operation of the PIN phase shifter 102.

There may be instances in which the space available for the conductive traces 120a and 120b may be limited, such as when multiple waveguides having PIN phase shifters are placed next to each other. In these instances, it may be desirable to reduce the width of the conductive traces 120a and 120b to allow the waveguides to be positioned closer to each other. Reducing the widths of the conductive traces 120a and 120b increases their resistance, which may create non-uniformities in the current flowing through the PIN diode 118. Specifically, a portion of the PIN diode 118 positioned closer to the current injection region 132 and the current extraction region 134 will have higher current density than a portion of the PIN diode 118 positioned farther from the current injection region 132 and the current extraction region 134. While the average current density passing through the diode (and thus the phase change) may remain the same, the maximum current density may increase and thereby increase the optical losses associated with a given phase change.

Figure 1C:
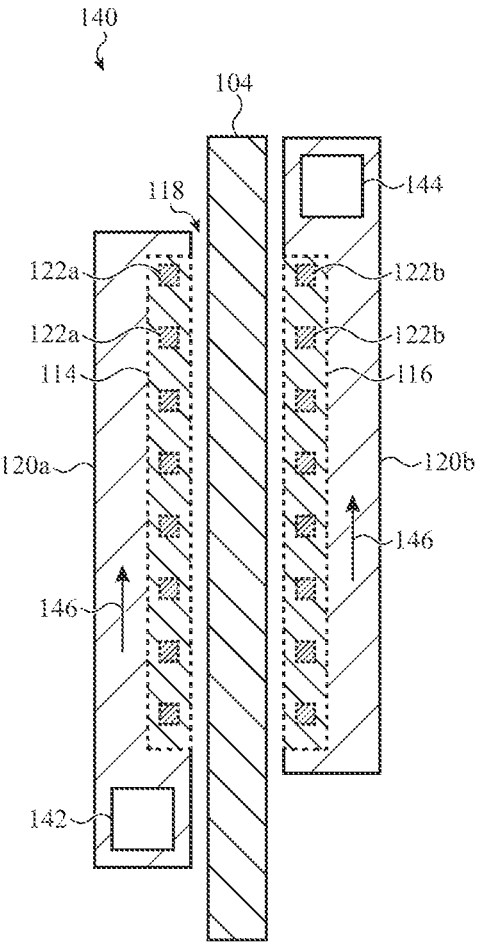
FIG. 1C shows a top view of another configuration of the optical phase shifter of FIG. 1A.

Conversely, in the PIN phase shifters described herein, the current injection region and the current extraction region of the conductive traces are positioned such that current flows through these traces in a common direction. For example, FIG. 1C shows a top view of a variation of a PIN phase shifter 140 as described herein. The PIN phase shifter 140 can be configured to have the same components as the PIN phase shifter 102 of FIG. 1A (with like components labeled the same as in FIG. 1A), except that the first conductive trace 120a has a current injection region 142 and the second conductive trace 120b has a current extraction region 144. Similar to the PIN phase shifter 130 of FIG. 1B, the current injection region 142 and the current extraction region 144 represent regions of the first conductive trace 120a and the second conductive trace 120b, respectively, that are electrically connected to a control circuit (not shown). The control circuit is operable to drive current through the PIN diode 118, such that current is injected into the first conductive trace 120a via the current injection region 142, flows through the PIN diode 118, and is extracted from the second conductive trace 120b via the current extraction region 144.

In the variation shown in FIG. 1C the current injection region 142 and the current extraction region 144 are positioned such that current flows through the first conductive trace 120a in a first direction 146 and flows through the second conductive trace 120b in the same first direction 146 along the length of the waveguide 104. This helps to equalize the current distribution across the length of the PIN diode 118 (which is parallel to the direction of current flow), which reduces the maximum current distribution as compared to PIN phase shifter 130 of FIG. 1B. This also reduces the impact of reducing the width of the first and second conductive traces 120a, 120b, and thus the overall width of the PIN phase shifter 140.

In the variation shown in FIG. 1C, the current injection region 142 and the current extraction region 144 are positioned on opposite ends of the PIN diode 118 along the length of the waveguide 104. Especially as the length of the PIN phase shifter 140 increases, this may increase the distance between the current injection region 142 and the current extraction region 144. In other instances it may be desirable to position the current injection region 142 closer to the current extraction region 144 while still maintaining the direction of current flow through the first and second conductive traces 120a, 120b.

Figure 2A:
FIGS. 2A and 2B show a cross-sectional side view and a top view, respectively, of a variation of an optical phase shifter as described herein.
Figure 2A:
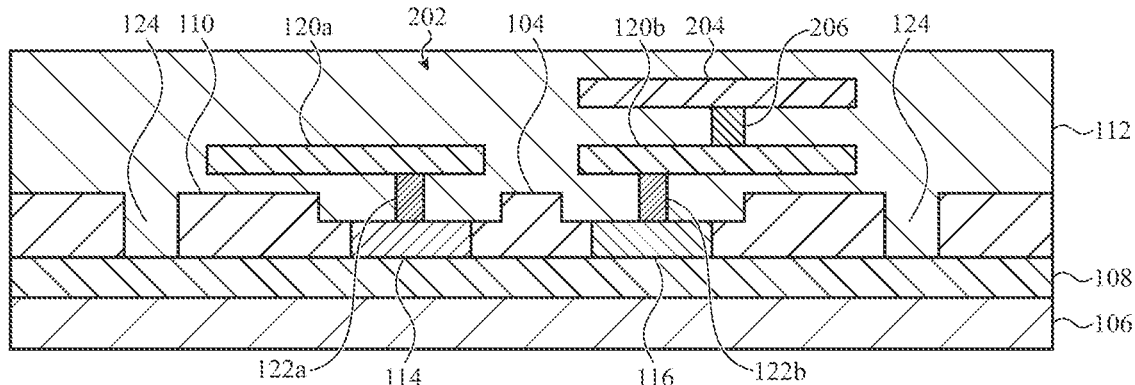
Figure 2B:
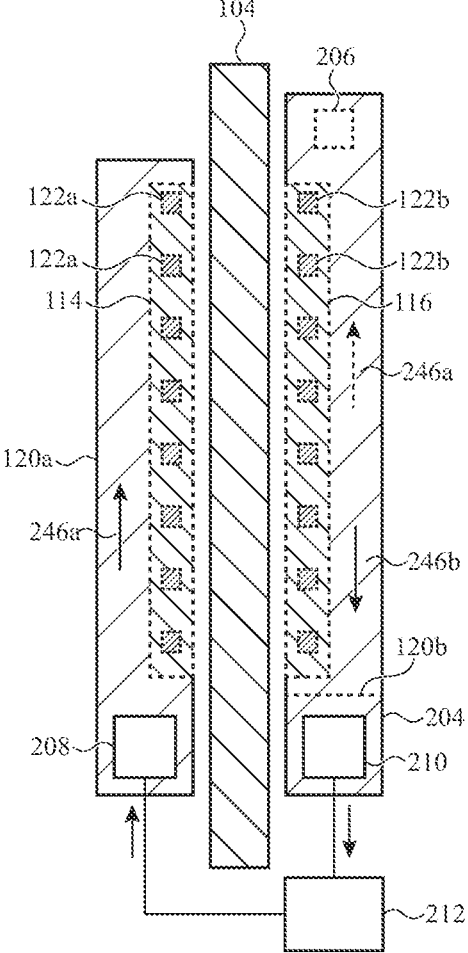

As an example, in some instances, the PIN phase shifter includes a third trace that is configured to route current from one end of the length of the PIN phase shifter to the other. For example, FIGS. 2A and 2B show an example of a photonic integrated circuit 200 having a PIN phase shifter 202. The photonic integrated circuit 200 and PIN phase shifter 202 may be configured the same as the photonic integrated circuit 100 and PIN phase shifter 140 shown in FIGS. 1A and 1C (with like components labeled the same), except that the PIN phase shifter 202 includes a third conductive trace 204. In the variation shown in FIGS. 2A and 2B, the third conductive trace 204 is positioned at least partially above and electrically connected to the second conductive trace 120b, though in other instances the third conductive trace 204 may instead be positioned at least partially above and electrically connected to the first conductive trace 120a. The third conductive trace 204 may be embedded in (as shown in FIG. 2A) or positioned on the second cladding layer 112, or otherwise suspended above the second conductive trace 120b such that at least a portion of the third conductive trace 204 overlays the second conductive trace 120b. The PIN phase shifter 202 includes a third set of conductive vias 206 (shown in FIG. 2B as a single via) that electrically connect the third conductive trace 204 to the second conductive trace 120b.

The third set of conductive vias 206 is positioned on a first side of the PIN diode 118 along the length of the waveguide 104. The third conductive trace 204 is positioned such that it extends from the first side to a second side of the PIN diode 118 opposite the first side along the length of the waveguide 104. The first conductive trace 120a includes a current injection region 208, while the third conductive trace 204 includes a current extraction region 210, each of which is connected to a control circuit 212 that is configured to drive current through the PIN diode 118 as described previously. The current injection region 208 and the current extraction region 210 are positioned on the same side of the PIN diode 118 along the length of the waveguide 104. Accordingly, current introduced into the first conductive trace 120a will travel in a first direction 246a along the first conductive trace 120a. Current that has passed through the PIN diode 118 will travel through the second conductive trace 120b in the first direction 246a until it reaches the third set of conductive vias. Current is passed to the third conductive trace 204 and travels in a second direction 246b opposite the first direction to the current extraction region 210. In this way, the PIN phase shifter 202 may achieve an equalized current density while still allowing the current injection region 208 and the current extraction region 210 to be positioned near one another.

Figure 3:
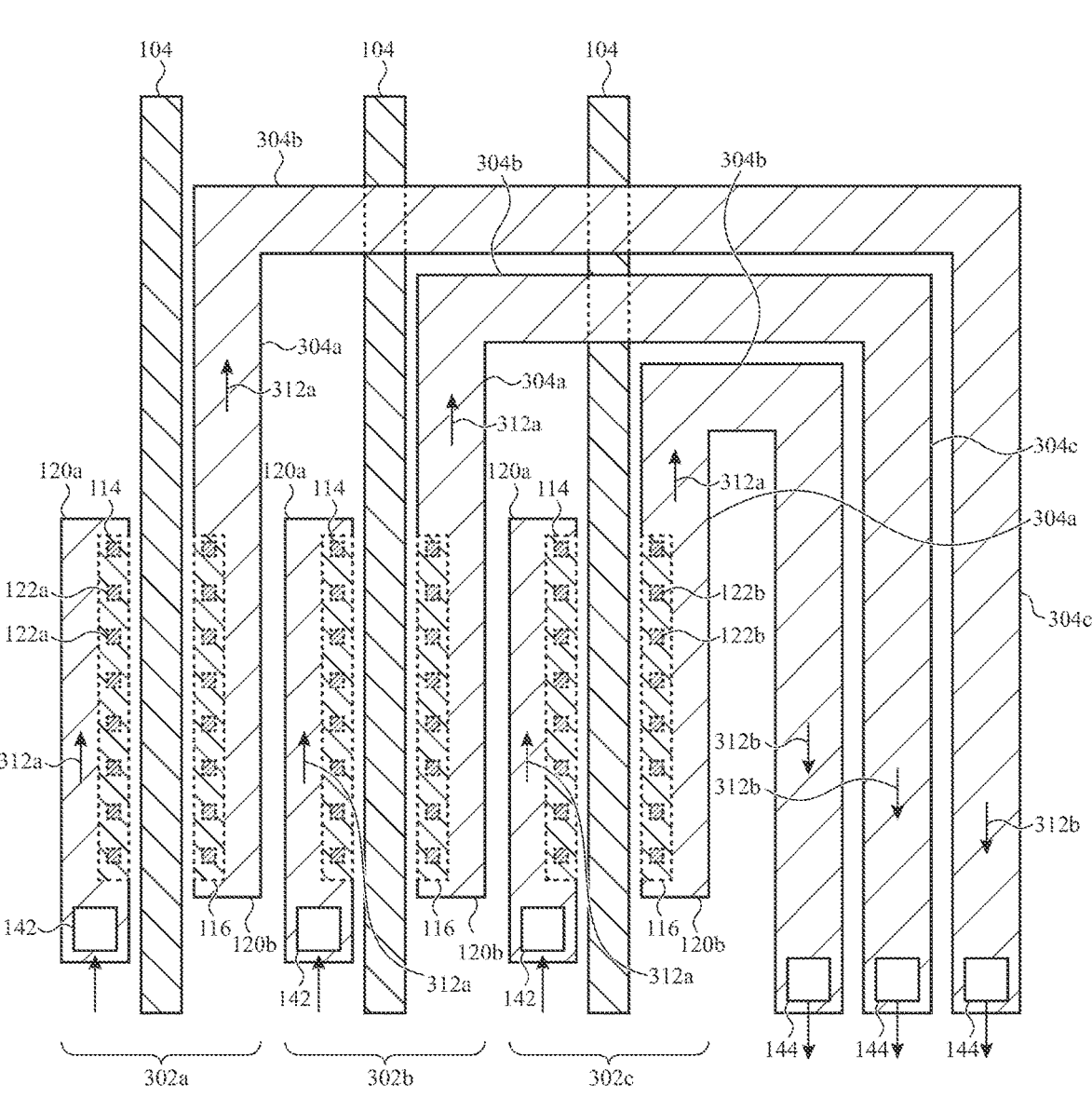
FIGS. 3, 4A, and 4B shows top views of variations of photonic integrated circuits having optical phase shifters as described herein.

In other instances, one of the conductive traces may have a turn or bend that causes a portion of the trace to return to traverse at least a part of the length of the PIN phase shifter. For example, FIG. 3 shows an example of a variation of a photonic integrated circuit 300 that includes a set of PIN phase shifters. In the variation shown in FIG. 3, the set of PIN phase shifters includes a first PIN phase shifter 302a, a second PIN phase shifter 302b, and a third PIN phase shifter 302c.

Each of these PIN phase shifters may be configured the same as the PIN phase shifter 140 of FIG. 1C (with like components labeled the same), except that the second conductive trace 120b of each PIN phase shifter includes a first portion 304a, a second portion 304b, and a third portion 304c. The first portion 304a is connected to the second set of conductive vias 122b in order to electrically connect the second conductive trace 120b to the second doping region 116. The second portion 304b connects the first portion 304a and the third portion 304c and provides a path for the current traveling through the second conductive trace 120b to change direction. In these instances, the second portion 304b is positioned on a first side of the PIN diode 118 along the length of the waveguide 104. The third portion 304c is positioned such that it extends from the first side to a second side of the PIN diode 118 opposite the first side along the length of the waveguide 104. In this way, the corresponding current injection region 142 and the current extraction region 144 for each of the PIN phase shifters 302a, 302b, and 302c are positioned on the same side of the PIN diode 118 along the length of the waveguide 104.

Current introduced into the first conductive trace 120a of one of the set of PIN phase shifters (e.g., the first PIN phase shifter 302a) via the current injection region 142 will travel in a first direction 312a. Current that has passed through the PIN diode 118 will travel through the first portion 304a of the second conductive trace 120b in the first direction 312a until it reaches the second portion 304b of the conductive trace 120b. Current is passed to the third portion 304c of the second conductive trace 120b (via the second portion 304b) and travels in a second direction 312b opposite the first direction 312a to the current extraction region 144. In this way, each of the PIN phase shifters 302a-302c may achieve an equalized current density (as compared to the PIN phase shifter 140 of FIG. 1C) while still allowing the current injection region 142 and the current extraction region 144 to be positioned near one another. Specifically, the current injection region 142 and the current extraction region 144 of each of the PIN phase shifters 302a-302c are connected to a control circuit as described previously. In these instances, the control circuit may individually control each of the PIN phase shifters 302a-302c as needed to provide different combinations of phase shifts in the corresponding waveguides.

In some variations, to help reduce the spacing between adjacent waveguide of the set of PIN phase shifters, the second portion 304b of the second conductive trace 120b of one PIN phase shifter overlaps the waveguide 104 of another PIN phase shifter. For example, in the variation shown in FIG. 3, the second portion 304b of the second conductive trace 120b of the first PIN phase shifter 302a crosses over the waveguides 104 of the second and third PIN phase shifters 302b, 302c. Similarly, the second portion 304b of the second conductive trace 120b of the second PIN phase shifter 302b crosses over the waveguide 104 of the third PIN phase shifter 302c. In this way, the third portions of the second conductive traces of the set of PIN phase shifters may be routed away from the waveguides of the set of PIN phase shifters. By not placing the third portions between the waveguides of adjacent PIN phase shifters, these waveguides may be positioned closer to each other.

Figure 4A:
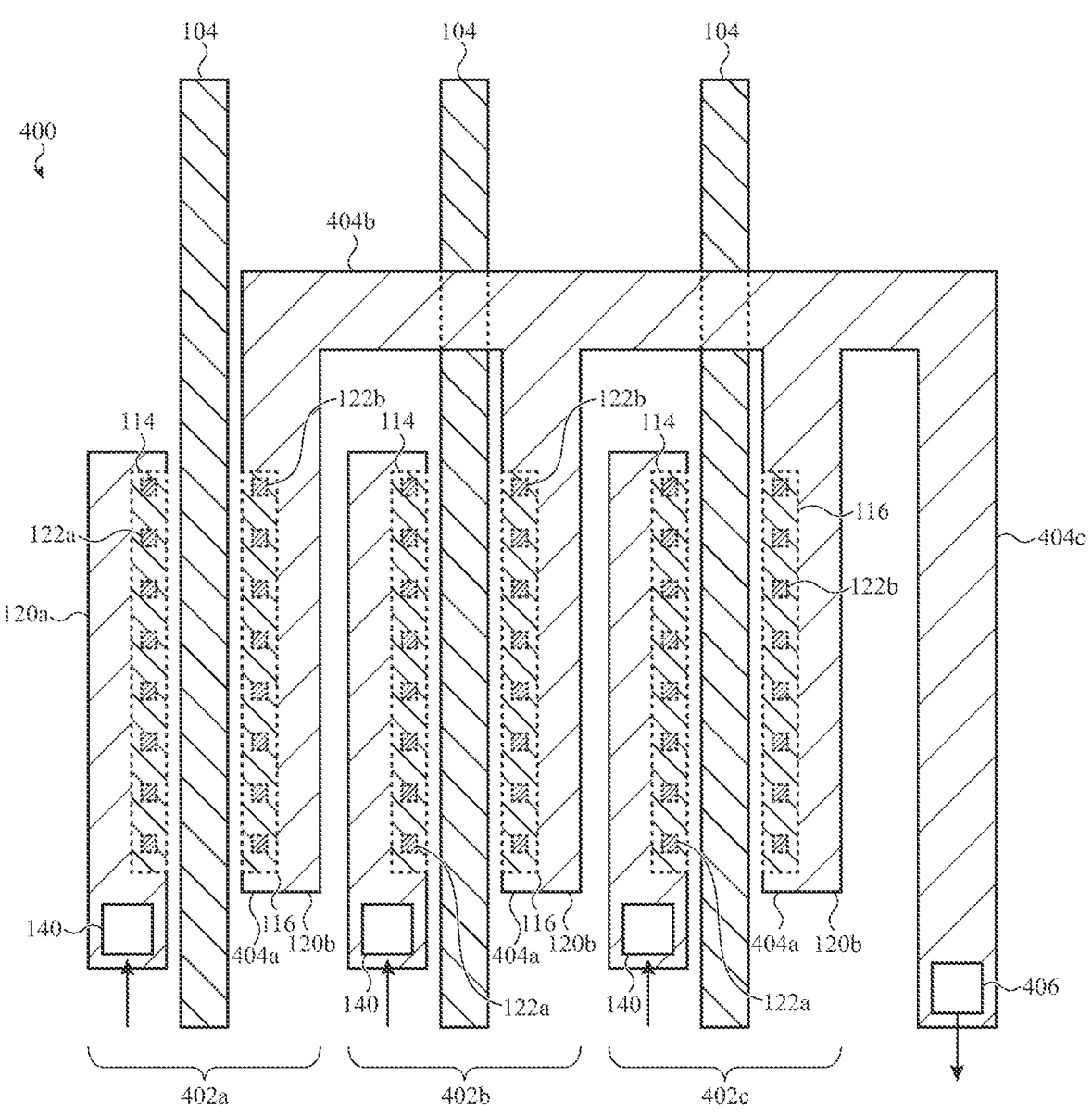

While each PIN phase shifter of the set of PIN phase shifters shown in FIG. 3 has a second conductive trace 120b that is separate and electrically isolated from the second conductive traces of the remaining PIN phase shifters, in other instances the second conductive traces 120*b* of two or more PIN phase shifters may be electrically connected. For example, FIG. 4A shows an example of a variation of a photonic integrated circuit 400 that includes a set of PIN phase shifters having a first PIN phase shifter 402*a*, a second PIN phase shifter 402*b*, and a third PIN phase shifter 402*c* (through the any suitable number of PIN phase shifters may be included). The set of PIN phase shifters of FIG. 4A is the same as the set of PIN phase shifters of FIG. 3 (with like components labeled the same), except that second conductive traces 120*b* of the set of PIN phase shifters share a common second portion 404*b* and a common third portion 404*c*. For example, each of the first PIN phase shifter 402*a*, the second PIN phase shifter 402*b*, and the third PIN phase shifter 402*c* has a corresponding second conductive trace 120*b* with a first segment 404*a* electrically connected to the common second portion 404*b* and the common third portion 404*c*. In this way, the common second portion 404*b* and the common third portion 404*c* may provide a common path for current being extracted from each of the set of PIN phase shifters (or a common path for injecting current in instances where the common second portion 404*b* and the common third portion 404*c* are instead connected to the first conductive trace 120*a* of each PIN phase shifter of the set of PIN phase shifters). The common third portion 404*c* may include a common current extraction region 406, which may be used to extract current from some or all of the PIN phase shifters of the set of PIN phase shifters. Specifically, the current injection region 142 of each of the PIN phase shifters 402*a*-402*c* and the common current extraction region 406 are connected to a control circuit as described previously. In these instances, the control circuit may individually control each of the PIN phase shifters 402*a*-402*c* as needed to provide different combinations of phase shifts in the corresponding waveguides.

Figure 4B:
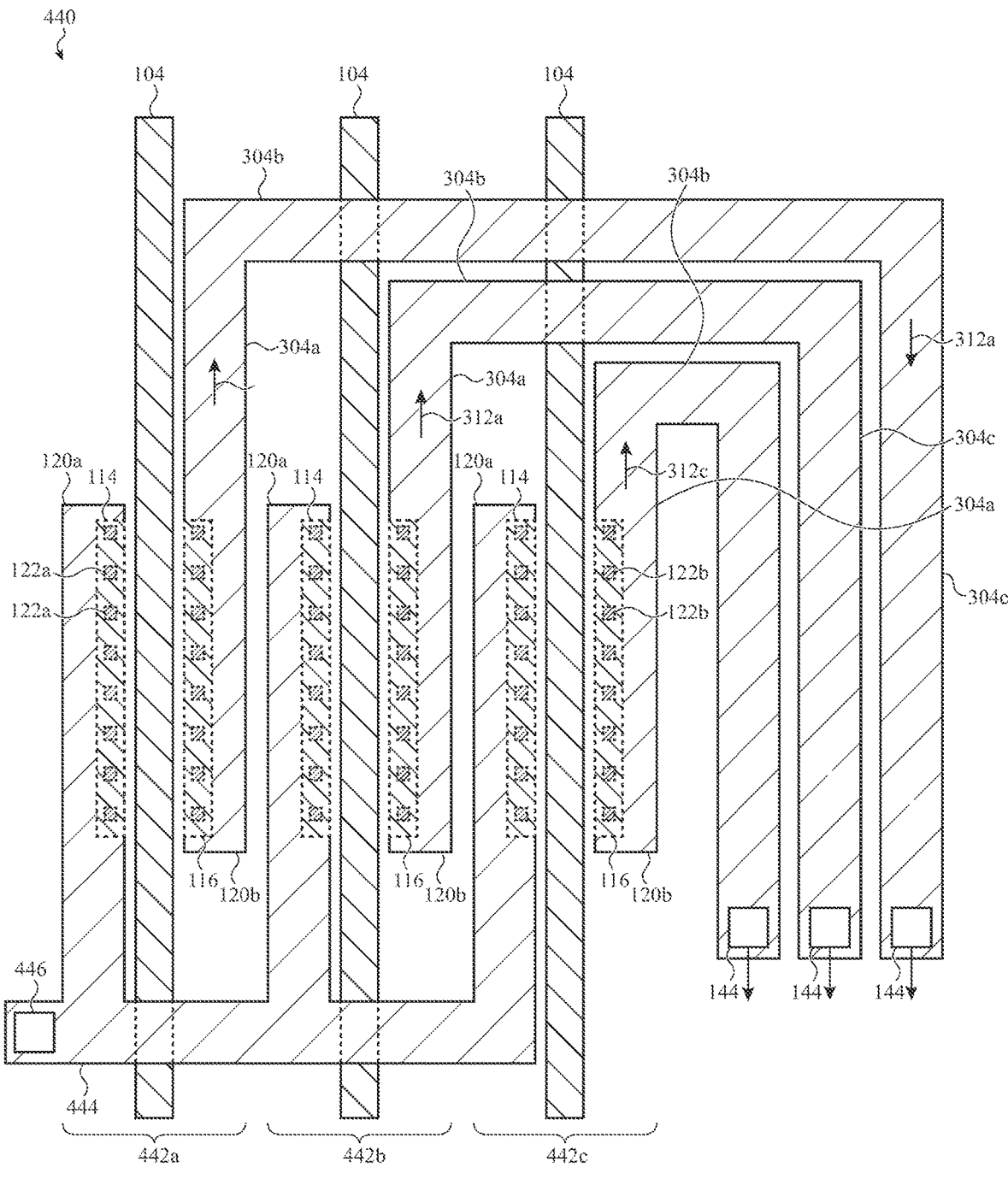

In other variations, the first conductive traces 120*a* of two or more PIN phase shifters may be electrically connected. For example, FIG. 4B shows an example of a photonic integrated circuit 440 that includes a set of PIN phase shifters having a first PIN phase shifter 442*a*, a second PIN phase shifter 442*b*, and a third phase shifter 442*c* (though any suitable number of PIN phase shifters may be included). The set of PIN phase shifters of FIG. 4B is the same as the set of PIN phase shifters of FIG. 3 (with like components labeled the same), except that the first conductive traces 120*a* of the set of PIN phase shifters are electrically connected via a common portion 444. The common portion 444 may include a common current injection region 446, which may be used to inject current to some or all of the PIN phase shifters 442*a*-442*c*. Specifically, the common current injection region 446 and the current extraction region 144 of each of the PIN phase shifters 442*a*-442*c* are connected to a control circuit as described previously. For example, in these instances the control circuit may be configured as a current sink driver in which current may be selectively drawn through any or all of the PIN phase shifters 442*a*-442*c*.

Figure 5:
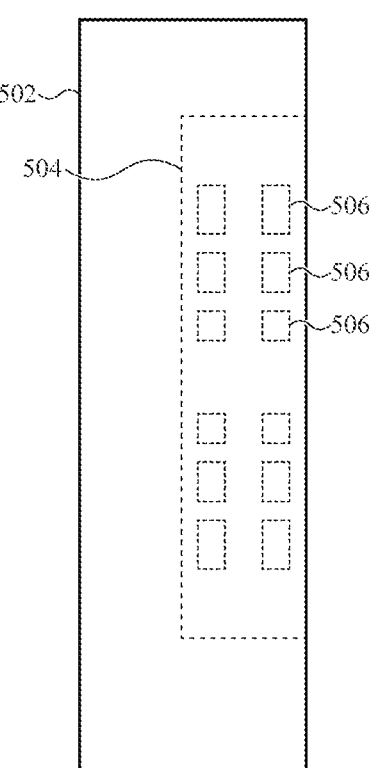
FIG. 5 shows a top view of a portion of an optical phase shifter as described herein.

Each of the first set of conductive vias 122*a* and the second set of conductive vias 122*b* are shown in the various embodiments as having conductive vias having the same size and spacing relative to immediately adjacent vias. It should be appreciated, however, that the size of the vias and/or the spacing between immediately adjacent vias may vary within a given set of conductive vias. In these instances, the size and spacing of the vias may impact the current distribution through the PIN diode of the PIN phase shifter, and thus may be used to help improve current density uniformity as desired. For example, FIG. 5 shows a portion of a PIN phase shifter 500 including a conductive trace 502 that is electrically connected to a doping region 504 via a first set of conductive vias 506. As shown there, the set of conductive vias 506 is arranged into an array having multiple rows and columns. Additionally, some of these conductive vias 506 have different sizes and spacing.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A photonic integrated circuit comprising:
a substrate;
a cladding layer supported by the substrate;
a waveguide layer positioned on the cladding layer, the waveguide layer comprising a first doping region, a second doping region, and a waveguide positioned between the first doping region and the second doping region to form a diode; and
a phase shifter comprising:
the diode;
a first set of conductive vias;
a first conductive trace electrically connected to the first doping region via the first set of conductive vias;
a second set of conductive vias;
a second conductive trace electrically connected to the second doping region via the second set of conductive vias; and
a control circuit configured to drive current through the diode via the first conductive trace and the second conductive trace, wherein:
the waveguide is configured to carry light along a length of the waveguide; and
the phase shifter is configured such that the current driven through the diode flows through the first conductive trace and the second conductive trace in a common direction along the length of the waveguide.

2. The photonic integrated circuit of claim 1, wherein the diode is a PIN diode.

3. The photonic integrated circuit of claim 1, wherein the phase shifter comprises:
a third set of conductive vias; and
a third conductive trace electrically connected to the second conductive trace via the third set of conductive vias.

4. The photonic integrated circuit of claim 3, wherein:
the phase shifter comprises a current injection region on the first conductive trace and a current extraction region on the third conductive trace; and
the control circuit is electrically connected to the current injection region and the current extraction region.

5. The photonic integrated circuit of claim 1, wherein:
the second conductive trace comprises a first portion, a second portion, and a third portion;
the first portion is connected to the second set of conductive vias; and
the phase shifter is configured such that current driven through the diode flows through the first portion in the common direction and flows through the third portion in an additional direction opposite the common direction.

6. The photonic integrated circuit of claim 5, wherein: the phase shifter comprises a current injection region on the first conductive trace and a current extraction region on the third portion; and the control circuit is electrically connected to the current injection region and the current extraction region.

7. The photonic integrated circuit of claim 1, wherein: the waveguide is a rib waveguide.

8. A photonic integrated circuit comprising:
a first phase shifter;
a second phase shifter;
and a control circuit configured to operate the first phase shifter and the second phase shifter, wherein:
  each of the first phase shifter and the second phase shifter comprises:
    a diode comprising a waveguide positioned between a first doping region and a second doping region;
    a first conductive trace electrically connected to the first doping region; and
    a second conductive trace electrically connected to the second doping region;
  the second conductive trace of the first phase shifter comprises a first portion, a second portion, and a third portion;
  the second portion of the second conductive trace of the first phase shifter crosses over the waveguide of the second phase shifter; and
  the waveguide of the first phase shifter is configured to carry light along a length of the waveguide of the first phase shifter;
  the control circuit is configured to drive current through the diode of the first phase shifter such that current flows through the first conductive trace of the first phase shifter and the first portion of the second conductive trace of the first phase shifter in a common direction along the length of the waveguide of the first phase shifter.

9. The photonic integrated circuit of claim 8, wherein: the first phase shifter comprises a current injection region on the first conductive trace of the first phase shifter and a current extraction region on the third portion of the second conductive trace of the first phase shifter; and the control circuit is electrically connected to the current injection region and the current extraction region.

10. The photonic integrated circuit of claim 8, wherein: the second conductive trace of the second phase shifter comprises a first portion, a second portion, and a third portion, and the control circuit is configured to drive current through the diode of the second phase shifter such that current flows:
  through the first conductive trace of the second phase shifter in the common direction;
  through the first portion of the second conductive trace of the second phase shifter in the common direction; and
  through the third portion of the second conductive trace of the second phase shifter in an additional direction opposite the common direction.

11. The photonic integrated circuit of claim 8, wherein: the second conductive trace of the second phase shifter is electrically connected to the second portion of the second conductive trace of the first phase shifter.

12. The photonic integrated circuit of claim 8, wherein: the diode of each of the first phase shifter and the second phase shifter is a PIN diode.

13. The photonic integrated circuit of claim 8, comprising:
a third phase shifter that comprises:
  a diode comprising a waveguide positioned between a first doping region and a second doping region;
  a first conductive trace electrically connected to the first doping region; and
  a second conductive trace electrically connected to the second doping region.

14. The photonic integrated circuit of claim 13, wherein: the second portion of the second conductive trace of the first phase shifter crosses over the waveguide of the third phase shifter.

15. The photonic integrated circuit of claim 14, wherein: the second conductive trace of the second phase shifter comprises a first portion, a second portion, and a third portion; and the second portion of the second conductive trace of the second phase shifter crosses over the waveguide of the third phase shifter.

16. The photonic integrated circuit of claim 13, wherein: the second conductive trace of the second phase shifter comprises a first portion, a second portion, and a third portion; and the second portion of the second conductive trace of the second phase shifter crosses over the waveguide of the third phase shifter.

17. A photonic integrated circuit comprising:
a first phase shifter;
a second phase shifter;
and a control circuit configured to operate the first phase shifter and the second phase shifter, wherein:
  each of the first phase shifter and the second phase shifter comprises:
    a diode comprising a waveguide positioned between a first doping region and a second doping region;
    a first conductive trace electrically connected to the first doping region; and
    a second conductive trace electrically connected to the second doping region;
  the second conductive trace of the first phase shifter and the second conductive trace of the second phase shifter are electrically connected to a common conductive trace;
  the control circuit is configured to drive current through the diode of the first phase shifter such that current flows through the first conductive trace of the first phase shifter and a first portion of the second conductive trace of the first phase shifter in a common direction along a length of the waveguide of the first phase shifter.

18. The photonic integrated circuit of claim 17, wherein: the common conductive trace comprises a first portion that crosses over the waveguide of the second phase shifter.

19. The photonic integrated circuit of claim 18, comprising:
a third phase shifter that comprises:
  a diode comprising a waveguide positioned between a first doping region and a second doping region;
  a first conductive trace electrically connected to the first doping region; and
  a second conductive trace electrically connected to the second doping region, wherein:

the second conductive trace of the third phase shifter is electrically connected to the common conductive trace.

20. The photonic integrated circuit of claim 19, wherein: the first portion of the common conductive trace crosses over the waveguide of the third phase shifter.

* * * * *